United States Patent
Weng

[11] Patent Number: 5,983,728
[45] Date of Patent: Nov. 16, 1999

[54] WATCH-TYPE PRESSURE GAUGE

[76] Inventor: Hsi-Kuang Weng, No. 306, He Shun Rd., He Mei Chen, Chang Hua Hsien, Taiwan

[21] Appl. No.: 09/172,176

[22] Filed: Oct. 14, 1998

[51] Int. Cl.[6] .............................. G01L 7/16; G01L 19/12; G01D 11/00
[52] U.S. Cl. .............................. 73/744; 116/271; 116/285
[58] Field of Search .............................. 73/700, 712, 714, 73/744, 745, 746, 146.2–8; 116/34 R, 266, 271, 285

[56] References Cited

U.S. PATENT DOCUMENTS

| | | | |
|---|---|---|---|
| 4,773,271 | 9/1988 | Mutou et al. | 73/741 |
| 4,827,764 | 5/1989 | Hwang | 73/146.8 |
| 4,970,899 | 11/1990 | Huang | 73/744 |
| 5,131,275 | 7/1992 | Huang | 73/756 |

*Primary Examiner*—Benjamin R. Puller
*Assistant Examiner*—Abdullahi Aw-Musse
*Attorney, Agent, or Firm*—Browdy and Neimark

[57] ABSTRACT

A pressure gauge has a base which is provided with a slot, and a sliding block located in the slot such that the sliding block is pushed to displace by a piston rod which is in turn pushed by the air pressure to be measured. The sliding block is provided with a plurality of teeth for actuating a rotary shaft and a hand fastened at one end thereof with the rotary shaft. The hand is actuated to turn to point at an air pressure reading. The base is provided with a threaded hole, an adjusting screw engaged with the threaded hole, and a spring which is engaged at one end thereof with the sliding block and at other end thereof with the adjusting screw. The pressure gauge is calibrated by adjusting the position of the adjusting screw in the threaded hole.

5 Claims, 3 Drawing Sheets

WATCH-TYPE PRESSURE GAUGE

FIELD OF THE INVENTION

The present invention relates generally to a pressure gauge, and more particularly to a watch-type pressure gauge.

BACKGROUND OF THE INVENTION

As shown in FIG. 1, a tire pressure gauge 10 of the prior art is composed of a head 11 via which the high pressure air in the tire is introduced into the gauge, a piston rod 11A, a base 12, and a drive member 13 capable of being pushed by the piston rod 11A to slide such that a rotary shaft 14 is actuated by teeth 13A of the drive member 13, and that a hand (not shown in the drawing) which is fastened with one end of the rotary shaft 14 is actuated to turn to indicate the air pressure of the tire. The drive member 13 is provided with an adjusting screw 15, whereas the base 12 is provided with a spring 16 which is fitted at one end 16A thereof over the adjusting screw 15 and is fastened at other end thereof with a stop plate 17 of the base 12. The stop plate 17 has a through hole 17A, whereas the base 12 has a through hole (not shown in the drawing) corresponding in location to the through hole 17A. As a result, the fastening depth of the adjusting screw 15 can be adjusted with a screwdriver which is inserted into the base 12. The tension of the spring 16 can be thus set up to determine the sliding resisting force of the drive member 13 for correcting the measuring error of the tire pressure gauge 10.

In operation, as the head 11 is disengaged with the air valve of the tire, the hand of the gauge 10 is retained at a position by the retaining force of an arresting piece 18 of the rotary shaft 14. When a button 18A located at one end of the arresting piece 18 is pressed by the user of the gauge 10, the rotary shaft 14 is released by the arresting piece 18, thereby causing the spring 16 to force the drive member 13 to return to its original position. The hand is thus caused to point at zero of the pressure scale.

Such a tire pressure gauge 10 of the prior art as described above is defective in design in that it is complicated in construction, and that it is therefore not cost-effective, and further that the adjustment of the adjusting screw 15 can not be easily done with a screwdriver in view of the fact that the user can not see the adjusting screw 15.

SUMMARY OF THE INVENTION

It is therefore the primary objective of the present invention to provide a watch-type pressure gauge which is simple in construction and can be easily assembled and maintained.

It is another objective of the present invention to provide a watch-type pressure gauge with means for correcting easily the measuring error of the gauge.

In keeping with the principle of the present invention, the foregoing objectives of the present invention are attained by the watch-type pressure gauge consisting of a base which is provided with a slot, and a sliding block located in the slot such that the sliding block is pushed to displace by a piston rod which is in turn pushed by the air pressure to be measure. The sliding block is provided with a row of teeth for actuating a rotary shaft and a hand fastened with the rotary shaft. The hand is thus actuated to turn to indicate the air pressure reading. The base is provided with a threaded hole, an adjusting screw located in the threaded hole, and a spring which is engaged at one end thereof with the sliding block and at other end thereof with the adjusting screw. The measuring error of the gauge is corrected by adjusting the fastening depth of the adjusting screw to alter the tension of the spring so as to set up the displacement resisting force of the sliding block.

The foregoing objectives, features, functions, and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
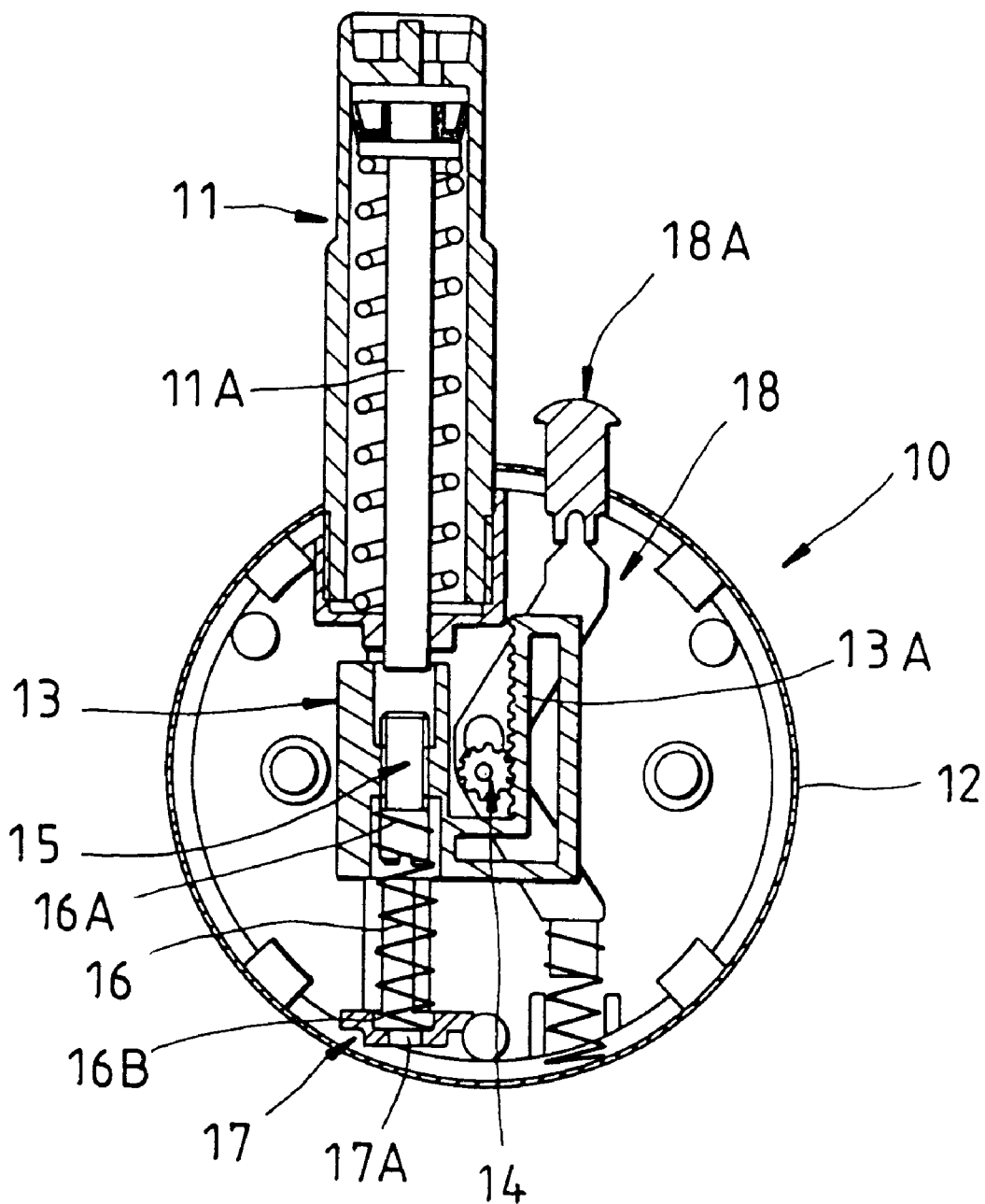
FIG. 1 shows a partial sectional view of a tire pressure gauge of the prior art.
Figure 2:
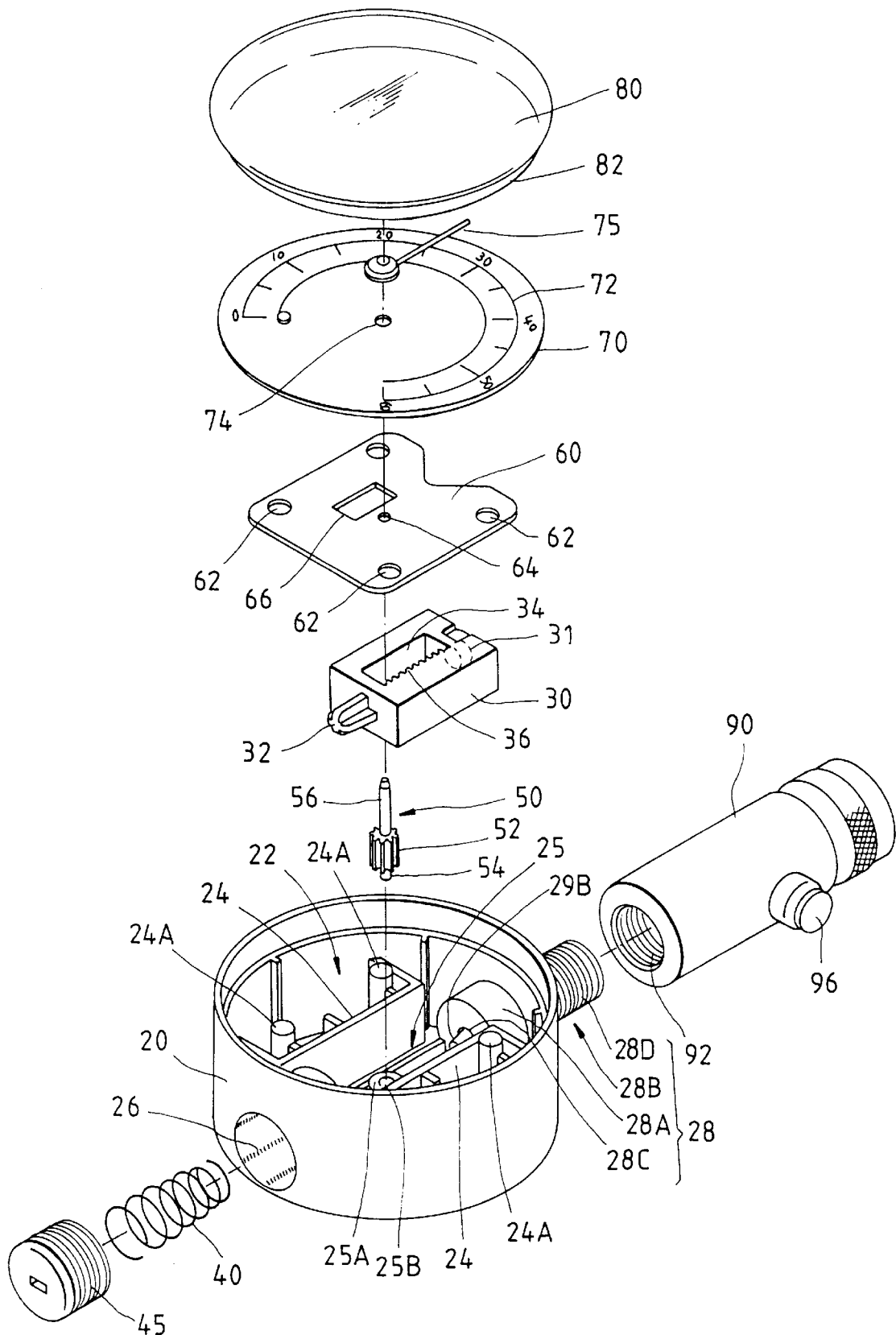
FIG. 2 shows an exploded view of a tire pressure gauge of the present invention.
Figure 3:
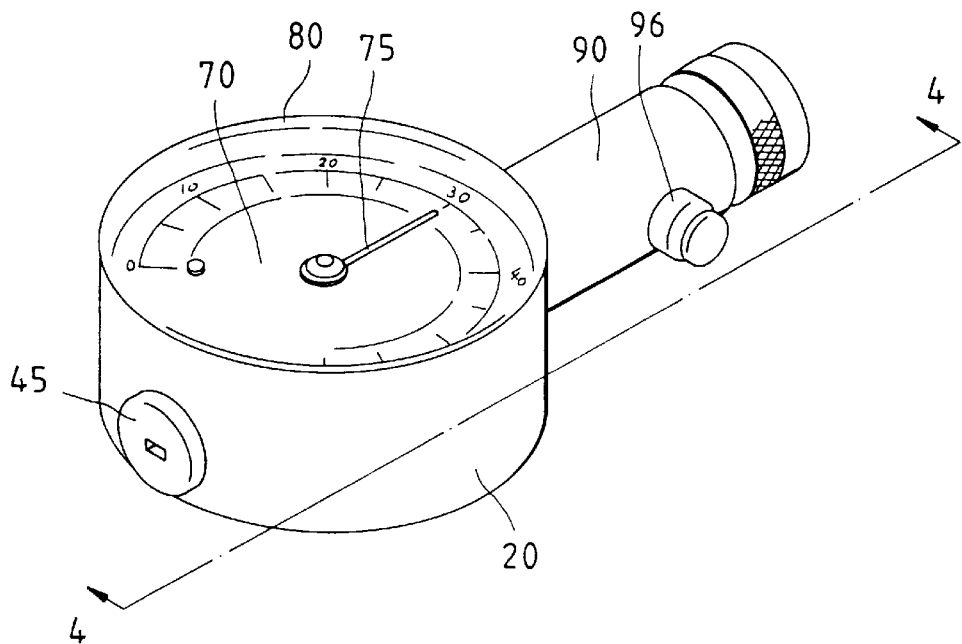
FIG. 3 shows a perspective view of the tire pressure gauge of the present invention in combination.
Figure 4:
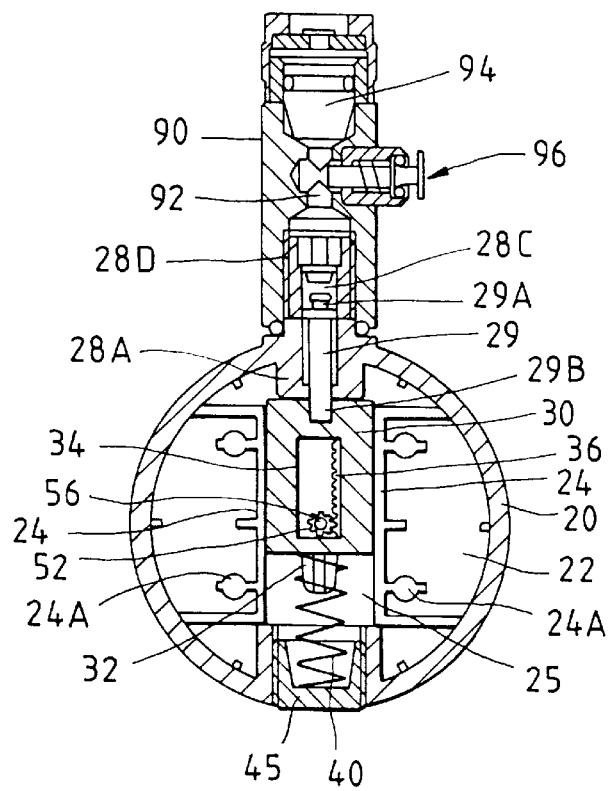
FIG. 4 shows a sectional view taken along the direction indicated by a line 4—4 as shown in FIG. 3.

As shown in FIGS. 2–4, a tire pressure gauge embodied in the present invention is composed of the component parts which are described hereinafter.

A base 20 is of a round housing and provided with a cell 22 which is in turn provided with two partitions 24 each having a retaining column 24A. Located between the two partitions 24 is a slot 25 which is defined by two opposite walls of the two partitions 24 and the bottom wall of the cell 22. The slot 25 is provided in the bottom thereof with a locating column 25A having in the top end thereof a pivoting hole 25B. The base 20 is provided in the wall thereof with a threaded hole 26 coaxial with the slot 25 and in communication with the slot 25. The base 20 is further provided with a connection head 28 opposite in location to the threaded hole 26 and having an inner end 28A, an outer end 28B, and an axial through hole 28C. the inner end 28A is located in the cell 22, whereas the outer end 28B is jutted out of the base 20. The outer end 28B is provided in the outer wall thereof with a threaded portion 28D. The cell 22 is in communication with the outside of the base 20 via the axial through hole 28C in which a piston rod 29 is located. The piston rod 29 has a thrust end 29A and an application end 29B. the thrust end 29A is located in the through hole 28C of the connection head 28, whereas the application end 29B is jutted out of the inner end 28A of the connection head 28. When the thrust end 29A of the piston rod 29 is exerted on by air pressure, the piston rod 29 is forced to slide in the axial through hole 28C such that the application end 29B is forced to move into the slot 25.

A sliding block 30 is rectangular in shape and located in the slot 25 such that the sliding block 30 is capable of sliding along the axial direction of the slot 25. The sliding block 30 is provided at one end thereof with a locating hole 31 for receiving the application end 29B of the piston rod 29, and at other end thereof with a protuberance 32. The sliding block 30 is further provided in the center thereof with a rectangular hole 34 in which the locating column 25A is received. The rectangular hole 34 is provided in the inner wall thereof with a plurality of teeth 36 arranged in a row.

A spring 40 has one end which is fitted over the protuberance 32, and other end which urges an adjusting screw 45. The tension of the spring 40 is set up by adjusting the position of the adjusting screw 45 in the threaded hole 26, thereby resulting in the determination of the resisting force that will be encountered with by the sliding block 30 at the time when the sliding block 30 displaces in the slot 25.

As is seen in FIG. 2, the axial through hole 28C of the connection head 28 (in which the piston rod 29 slides), the spring 40, and the gear teeth 36 which are arranged in a row are all substantially collinear.

A rotary shaft 50 has a toothed portion 52, and one end 54 which is pivoted to the pivoting hole 25B of the locating column 25A such that the toothed portion 52 is engaged with the teeth 36 of the sliding block 30.

A fastening plate 60 is provided with four retaining holes 62, one through hole 64, and an inspection hole 66. The four retaining columns 24A are retained in the four retaining holes 62. One end 56 of the rotary shaft 50 is put through the through hole 64 of the fastening plate 60.

A graduated plate 70 is located in the open end of the cell 22 of the base 20 and provided along the periphery thereof with a pressure graduation 72. The graduated plate 70 is provided in the center thereof with a through hole 74 through which one end 56 of the rotary shaft 50 is put.

A hand 75 is fastened at one end thereof with the end 56 of the rotary shaft 50 such that the hand 75 is actuated to turn to point at a specific degree of the graduation 72 to denote the measured quantity of the air pressure.

A cover 80 is made of a transparent material and has a bottom 82 which is secured to the open end of the cell 22 of the base 20 such that the graduated plate 70 is shielded by the cover 80.

A pressure measuring head 90 is provided with an axial through hole 92 which is engaged at one end thereof with the outer end 28B of the connection head 28 such that the axial through hole 92 is in communication with the through hole 28C of the connection head 28. The axial through hole 92 is provided at other end thereof with a check valve 94 and a deflation valve 96.

Before being shipped out to the retailer, the tire pressure gauge of the present invention is calibrated such that a standard air pressure source of a known value is connected with the check valve 94 of the pressure measuring head 90, and that the standard air pressure source is introduced into the axial through hole 92 of the pressure measuring head 90 and the through hole 28C of the connection head 28. As a result, the thrust end 29A of the piston rod 29 is exerted on by the standard air pressure source such that the piston rod 29 is pushed to displace along the direction of the longitudinal axis of the piston rod 29, and that the sliding block 30 is pushed by the application end 29B of the piston rod 29 to slide along the slot 25. The rotary shaft 50 is thus actuated by the teeth 36 to turn, with the hand 75 being actuated to turn along with the rotary shaft 50 to point at a scale denoting the value of the air pressure. In the event that the value of the air pressure so measured by the tire pressure gauge of the present invention is not on a par with the known value of the standard air pressure source, the correction can be made by adjusting the sliding resisting force of the sliding block 30. If the value of the measured air pressure is lower than that of the standard air pressure, the adjusting screw 45 is turned by a screwdriver such that the adjusting screw 45 is moved in the direction toward the open end of the threaded hole 26 with which the adjusting screw 45 is engaged, thereby resulting in the reduction in the sliding resisting force of the sliding block 30. On the other hand, if the value of the measured air pressure is higher than that of the standard air pressure, the adjusting screw 45 is turned by the screwdriver in a way that the adjusting screw 45 if moved in the direction away from the open end of the threaded hole 26 so as to result in an increase in the sliding resisting force of the sliding block 30. The standard air pressure source is released by pressing the deflation valve 96. The sliding block 30 is forced by the elastic force of the spring 40 to slide in reverse to return to its original position. The hand 75 is thus actuated to return to its original position at which the hand 75 points at the zero scale of the pressure graduation 72.

The pressure measuring head 90 is detachably fastened with the outer end 28B of the connection head 28 and is engageable with the inflation valve of a tire. The pressure measuring head 90 can be thus disengaged with the outer end 28B of the connection head 28 so as to connect the outer end 28B with a duct of an air pressure source. In other words, the air pressure gauge of the present invention can be used as a tire pressure gauge or pressure meter.

What is claimed is:

1. A pressure gauge comprising:

a base having a cell with an open end and a slot which is provided in a bottom thereof with a locating column which is in turn provided at a top end thereof with a pivoting hole, said base provided in a side wall thereof with a threaded hole located at one end of said slot, and an adjusting screw engaged with said threaded hole, said base further provided in said side wall thereof with a connection head fastened therewith such that said connection head is opposite in location to said threaded hole, said connection head having an inner end, an outer end and a through hole;

a piston rod having a thrust end and an application end and slidably received in said through hole of said connection head such that said thrust end is located in said through hole, and that said application end is jutted out of said inner end of said connection head;

a sliding block slidably located in said slot of said base such that one end of said sliding block is pressed against said application end of said piston rod, and that a hole of said sliding block is fitted over said locating column, said hole of said sliding block having an inner wall which is provided with a plurality of teeth arranged in a row;

a spring having two ends which urge respectively said adjusting screw and another end of said sliding block;

a rotary shaft pivoted at one end thereof to said pivoting hole of said locating column, said rotary shaft having a toothed portion which is engaged with said teeth of said sliding block;

a graduated plate secured to the open end of said cell of said base and provided with a through hole for receiving therein other end of said rotary shaft;

a hand fastened at one end thereof with the other end of said rotary shaft such that said hand turns along with said rotary shaft in motion; and a cover made of a transparent material and shielding said graduated plate;

said thrust end of said piston rod being exerted on by air pressure via said through hole of said connection head which is connected with a source of the air pressure, thereby forcing said application end of said piston rod to push said sliding block to displace in said slot such that said rotary shaft is actuated by said teeth of said sliding block to turn, and that said hand is actuated to turn along with said rotary shaft to point at a pressure scale of said graduated plate;

said adjusting screw intended to alter tension of said spring by adjusting a portion of said adjusting screw in said threaded hole so as to determine a magnitude of a displacement resisting force of said sliding block for calibrating the pressure gauge.

2. The pressure gauge as defined in claim 1 further comprising a plurality of retaining columns and a fastening plate, said retaining columns being located at an outer periphery of said slot, said fastening plate having a plurality of retaining holes and a through hole, with said retaining holes being engaged with said retaining columns, and with said through hole receiving one end of said rotary shaft.

3. The pressure gauge as defined in claim 1, wherein said sliding block is provided at one end thereof with a locating hole for locating said application end of said piston rod.

4. The pressure gauge as defined in claim 1 further comprising a pressure measuring head having a through hole and one end which is fastened with said outer end of said connection head such that said through hole of said pressure measuring head is in communication with said through hole of said connection head, said pressure measuring head having other end which is provided with a check valve and a deflation valve.

5. The pressure gauge as defined in claim 1, wherein the piston rod, the spring, and the plurality of gear teeth arranged in a row are substantially collinear.

* * * * *